United States Patent
Swartz et al.

(10) Patent No.: US 11,194,818 B1
(45) Date of Patent: Dec. 7, 2021

(54) PROMOTING SOCIAL MEDIA CONTENT IN SEARCH

(71) Applicant: Google LLC, Mountain View, CA (US)

(72) Inventors: Luke Hiro Swartz, San Francisco, CA (US); Zhengrong Ji, Sunnyvale, CA (US); Michael Chu, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 202 days.

(21) Appl. No.: 16/104,388

(22) Filed: Aug. 17, 2018

Related U.S. Application Data (63) Continuation of application No. 14/716,693, filed on May 19, 2015, now abandoned.

(60) Provisional application No. 62/000,083, filed on May 19, 2014.

(51) Int. Cl.
| | |
|---|---|
| G06F 16/2457 | (2019.01) |
| G06Q 30/02 | (2012.01) |
| G06F 16/951 | (2019.01) |
| G06Q 50/00 | (2012.01) |

(52) U.S. Cl.
CPC ...... *G06F 16/24578* (2019.01); *G06F 16/951* (2019.01); *G06Q 30/0275* (2013.01); *G06Q 50/01* (2013.01)

(58) Field of Classification Search
CPC ............... G06Q 30/0275; G06Q 50/01; G06F 16/24578; G06F 16/951
See application file for complete search history.

(56) References Cited

U.S. PATENT DOCUMENTS

| | | | | |
|---|---|---|---|---|
| 8,972,275 B2 * | 3/2015 | Park | ....................... | G06Q 50/01 |
| | | | | 705/7.29 |
| 2011/0276397 A1 * | 11/2011 | Moxley | .................. | G06Q 30/02 |
| | | | | 705/14.52 |
| 2011/0307397 A1 * | 12/2011 | Benmbarek | ............ | G06Q 50/01 |
| | | | | 705/319 |
| 2012/0095976 A1 * | 4/2012 | Hebenthal | ........... | G06F 16/9535 |
| | | | | 707/706 |
| 2013/0073336 A1 | 3/2013 | Heath | | |
| 2013/0159403 A1 * | 6/2013 | Zigoris | ................... | H04L 67/22 |
| | | | | 709/204 |
| 2014/0122234 A1 * | 5/2014 | Wald | .................. | G06Q 30/0256 |
| | | | | 705/14.54 |
| 2015/0006414 A1 * | 1/2015 | Janapareddy | ...... | G06Q 10/1053 |
| | | | | 705/319 |
| 2015/0066615 A1 * | 3/2015 | Gandhi | ............. | G06Q 30/0214 |
| | | | | 705/14.16 |

* cited by examiner

*Primary Examiner* — David J Stoltenberg
*Assistant Examiner* — Michael J Cross
(74) *Attorney, Agent, or Firm* — Fish & Richardson P.C.

(57) ABSTRACT

Methods, systems, and apparatus, including computer programs encoded on a computer storage medium, for receiving a query, receiving a set of social search results including one or more social media items that have been distributed through one or more computer-implemented services, each social media item being responsive to the query, providing a sub-set of social search results based on respective promotion scores provided in an auction, the sub-set of social search results including at least one social media item of the set of social search results, and providing the sub-set of social search results for display in a search results page, social media items of the sub-set of social search results being displayed based on respective promotion scores.

20 Claims, 3 Drawing Sheets

PROMOTING SOCIAL MEDIA CONTENT IN SEARCH

CROSS-REFERENCE TO RELATED APPLICATIONS

This application is a continuation of U.S. application Ser. No. 14/716,693, filed May 19, 2015, which claims the benefit of U.S. Provisional Application No. 62/000,083, filed May 19, 2014, the disclosure of each are incorporated by reference herein.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., click on, search results to acquire information of interest.

SUMMARY

This specification relates to providing search results in response to a query.

Implementations of the present disclosure are generally directed to promoting social media content in search results in response to a query. In general, innovative aspects of the subject matter described in this specification can be embodied in methods that include actions of receiving a search query, receiving a set of search results including one or more search results that are responsive to the search query, receiving a set of social search results including one or more social media items that have been distributed through one or more social networking services, each social media item being responsive to the search query, providing a sub-set of social search results based on respective promotion scores provided in an auction, each promotion score being determined based on a bid attribute of a respective promoter, the sub-set of social search results including at least one social media item of the set of social search results, and providing the set of search results and the sub-set of social search results for display in a search results page, social media items of the sub-set of social search results being displayed based on respective promotion scores. Other implementations of this aspect include corresponding systems, apparatus, and computer programs, configured to perform the actions of the methods, encoded on computer storage devices.

Innovative aspects of the subject matter described in this specification can be embodied in methods that include actions of receiving a query, receiving a set of social search results including one or more social media items that have been distributed through one or more computer-implemented services, each social media item being responsive to the query, providing a sub-set of social search results based on respective promotion scores provided in an auction, the sub-set of social search results including at least one social media item of the set of social search results, and providing the sub-set of social search results for display in a search results page, social media items of the sub-set of social search results being displayed based on respective promotion scores. Other implementations of this aspect include corresponding systems, apparatus, and computer programs, configured to perform the actions of the methods, encoded on computer storage devices.

These and other implementations can each optionally include one or more of the following features: actions further include providing one or more promotion scores for each social search result in the set of social search results, each promotion score being based on a bid attribute and a relevance score associated with the respective social search result; the bid attribute includes a maximum bid amount; the relevance score is determined based on a relevance of the respective social search result to the query; the relevance score is determined based one or more of a location and a time; the sub-set of social search results includes a plurality of social search results, the plurality of social search results being displayed in a rank order based on the respective promotion scores; and social media items of the sub-set of social search results are displayed separately from search results.

Particular implementations of the subject matter described in this specification can be implemented so as to realize one or more of the following advantages. In some examples, social media content that a user may be interested in is displayed in response to the user's search query. In some examples, social media content promoters are provided an opportunity to promote content to users who are likely interested in the content.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
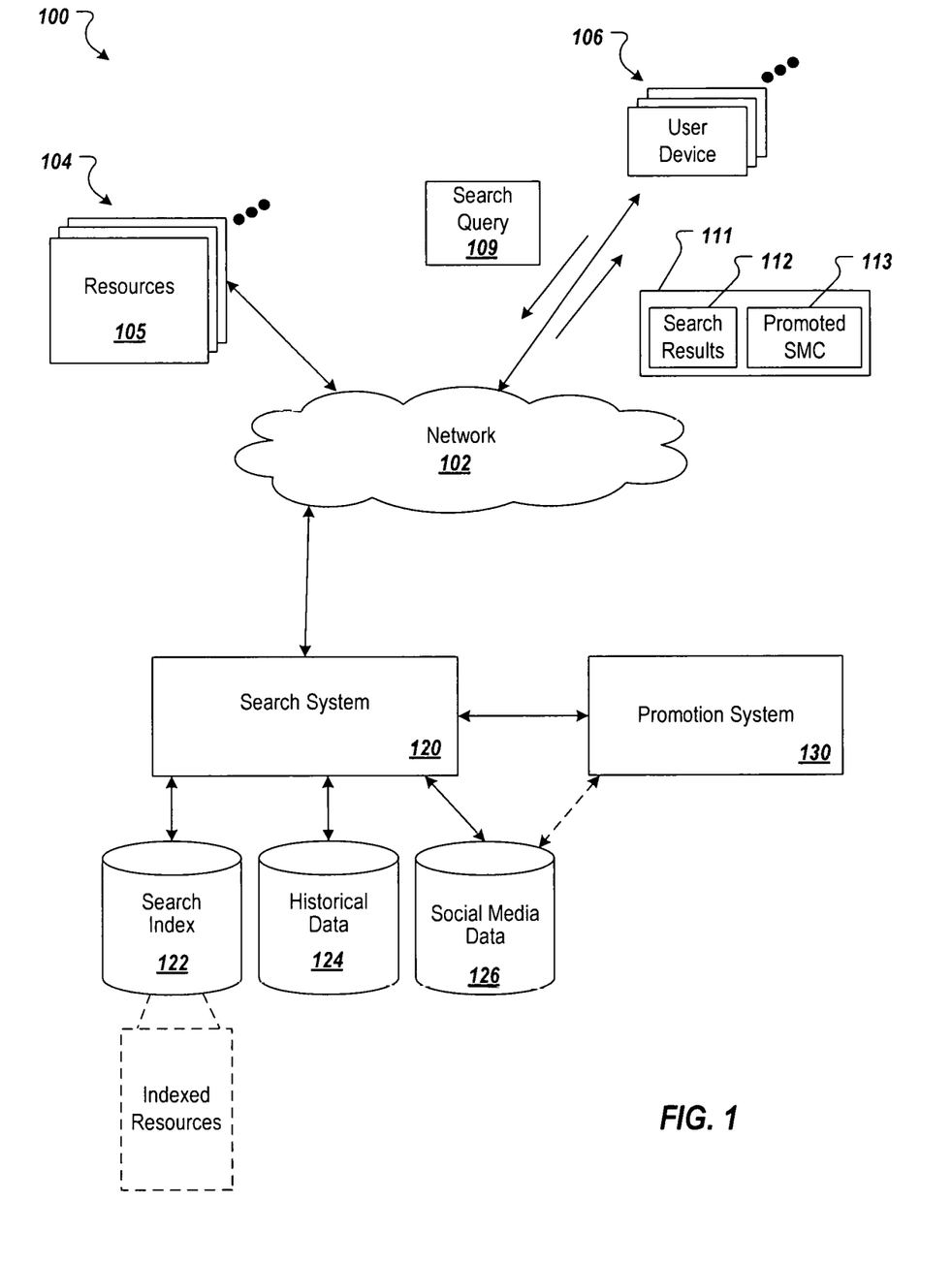
FIG. 1 depicts an example environment in which a search system provides promoted social media content.

FIG. 1 depicts an example environment 100 in which users can interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 that provides a search service is depicted, which is described in further detail herein. It is contemplated, however, that implementations of the present disclosure can include one or more computer-implemented services, such as the examples discussed herein.

With continued reference to FIG. 1, the example environment 100 includes a network 102, e.g., a local area network (LAN), wide area network (WAN), the Internet, or a combination thereof, which connects web sites 104, user devices 106, and the search system 120. In some examples, the network 102 can be accessed over a wired and/or a wireless communications link. For example, mobile computing devices, such as smartphones can utilize a cellular network to access the network. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is under control of a user and is capable of requesting and receiving resources 105 over the network 102. Example user devices 106 include personal computers, mobile computing devices, e.g., smartphones and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 typically includes a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data provided by the search system 120 that identifies a resource 105 that is responsive to a particular search query. In some example, the search result 112 includes a link to a respective resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In some implementations, a search result can include a social search result. In some examples, a social search result includes content posted to one or more of a social networking service, a blogging service, and a micro-blogging service, among other possible services. In some examples, a social search result is responsive to a query received from a user, and includes content posted using a computer-implemented service.

In accordance with implementations of the present disclosure, the example environment 100 also includes a promotion system 130 communicably coupled to the search system 120, e.g., directly coupled or coupled over a network such as network 102. In some examples, the search system 120 can interact with the promotion system 130 to provide one or more promoted social search results, as described in further detail herein. In some examples, the promotion system 130 provides one or more promoted social search results based on the query and an auction. In some examples, the search system 120 receives data from the promotion system to include one or more promoted social search results 113 in the search results display 111.

Implementations of the present disclosure are generally directed to promoting social media content in search results. More particularly, implementations include receiving a query, receiving a set of social search results including one or more social media items that have been distributed through one or more computer-implemented services, e.g., social networking services. In some examples, each social media item is responsive to the query. A sub-set of social search results is provided based on respective promotion scores provided in an auction, the sub-set of social search results including at least one social media item of the set of social search results. The sub-set of social search results are provided for display in a search results page, social media items of the sub-set of social search results being displayed based on respective promotion scores.

In some implementations, a search query is received. For example, a user can submit a search query to a computer-implemented search service, e.g., the search service provided by the search system 120 of FIG. 1. In some examples, one or more search results are provided, which are responsive to the search query. For example, and in response to the example search query, example search results can include one or more web-based search results. Example search results can include one or more uniform resource indicators (URIs), one or more snippets of text, e.g., associated with respective URIs, one or more images, one or more videos. In some examples, search results can include respective summaries of and/or links to web-based resources.

In accordance with implementations of the present disclosure, a set of social search results can be received. In some examples, the set of social search results includes one or more social media items that are each responsive to the query. In some examples, a social media item includes digital content that is distributed through one or more computer-implemented social networking services. Example digital content includes text, images, hyperlinks, audio and/or video. An example social media item includes a post that an author posted to one or more social networking services.

In some implementations, social media items can be associated with one or more tags. For example, a social media item that is distributed through a social networking service can be processed, and one or more tags can be associated therewith. Example tags can reflect keywords and/or knowledge graph topics. For example, an example social media item can include a post describing a performance of an artist at a named venue. The example social media item can be processed and one or more keywords and/or one or more knowledge graph topics can be associated with the social media item. Example keywords can include the name of the artist and the name of the venue. In some examples, a knowledge graph represents information that is structured based on one or more schemas. Example knowledge graph topics can include the artist, the venue, and the location of the venue.

In some implementations, a superset of social search results can be reviewed based on the search query to determine social media items that are to be included in the set of social search results. In some examples, the search query can be processed to have one or more tags associated therewith, e.g., one or more keywords and/or one or more knowledge graph topics. In some examples, tags of the search query are compared with tags of the respective social media items to identify social media items that are responsive to the query. In some examples, if a threshold number of tags, e.g., at least one, of a social media item correspond to respective tags of the search query, the social media item is included in the set of search results.

In some implementations, one or more indices are provided and can be used to determine social media items that are responsive to the search query. In some examples, one or more social media indices map social media items to respective queries. In some examples, when the search query is received, the search query can be cross-referenced with the one or more indices to identify social media items that are relevant to the search query.

In some implementations, each social media item in the set of social search results is associated with a respective relevance score. In some examples, each relevance score reflects a degree of relevance that a respective social media item has to the search query. In this manner, the relevance score is item-specific and query-specific. In some examples, relevance score can be determined based on a degree of overlap between tags of the search query and tags of the respective social media item. For example, a social media item having a plurality of tags in common with tags of the search query will have a greater relevance score than a social media item having only one tag in common with tags of the search query. In some examples, the relevance score can be determined based on time. For example, a social media item that is about an event that has already occurred, the relevance score can be reduced. In some examples, the relevance score can be determined based on location. For example, if an event that is the topic of a social media item is greater than a threshold distance away from a location determined for the user that submitted the query, the relevance score can be reduced. In this manner, relevance scores can also be user-specific, e.g., based on information associated with the user that submitted the search query. In some examples, relevance scores are normalized. In some examples, relevance scores range from a minimum value, e.g., 0, and a maximum value, e.g., 1.

In some implementations, a set of candidate social search results is provided based on the set of social search results. In some examples, candidate social search results include social media items that are available to be promoted. In some examples, the super-set of social search results includes social media items regardless of whether respective social media items are available to be promoted. Accordingly, social media items that are not available to be promoted can be filtered from the set of social search results to provide the set of candidate social search results.

In some examples, a social media item can be associated with an indication as to whether the social media item is available to be promoted by an author of the respective social media item. In some examples, an author can provide an indication to a social networking service that the author would like to promote social media items that the author distributes using the social networking service. In some examples, the author can be a promoter and can provide one or more bid attributes for auction-based promotion of their social media items, as discussed in further detail herein.

In some examples, social media items can be associated with an indication as to whether a respective social media item can be promoted by one or more third-parties. For example, authors that distribute social media content using a social networking service can maintain a profile with the social networking service. In some examples, in the profile, an author can provide a setting that either allows or disallows the author's social media items to be promoted by one or more third-parties. In some examples, the author can identify one or more third-parties that are permitted to promote the author's posts through auction-based promotion, e.g., the author whitelists one or more third-parties. In some examples, a third-party can submit a request to the author that the third-party be permitted to promote the author's social media items, and, in response, the author can approve or deny the request.

In some examples, the super-set of social search results only includes social media items that are available to be promoted. Accordingly, the set of candidate social search results is provided as the set of social search results.

In accordance with implementations of the present disclosure, a sub-set of social search results can be provided from the set of candidate social search results based on an auction. In some examples, the sub-set of social search results includes one or more candidate social media items of the set of candidate social search results. In some implementations, a plurality of promoters is associated with the auction. In some examples, the plurality of promoters includes promoters associated with social media items in the sub-set of social search results. In some examples, the plurality of promoters includes promoters that are associated with social media items in the sub-set of social search results, and that have registered to participate in auctions for promoting social media items.

In accordance with the auction, each promoter bids to have a respective social media item promoted in search results. Example promoters can include authors of social media items and/or third parties, e.g., a non-author of a respective social media item. In some examples, each promoter can provide one or more bid attributes. Example bid attributes can include a maximum bid amount, e.g., US dollars, for promoting a social media item. In some examples, the maximum bid amount is based on respective authors of social media items. For example, a promoter can provide a maximum bid amount of $X for social media posts that the promoter is the author of, a maximum bid amount of $Y for social media posts that one or more pre-identified authors are, respectively, the author of, and/or a maximum bid amount of $Z for social media posts that one or more other authors are, respectively, the author of. Consequently, and in some examples, each promoter can provide a plurality of bid attributes, and a particular bid attribute is selected for the auction based on the respective social media item.

In some implementations, bid attributes can be provided at a finer granularity. For example, a promoter can provide a plurality of bid attributes for a respective author. In some examples, each bid attribute can correspond to a respective topic. For example, and for a particular author, a promoter can provide a first maximum bid amount for a first topic, and a second maximum bid amount for a second topic. In some examples, if a post posted by the particular author corresponds to the first topic, the first maximum bid amount is used in a subsequent auction, and if the post corresponds to the second topic, the second maximum bid amount is used in the subsequent auction. In some examples, if the post does not correspond to either the first topic or the second topic, the promoter is not included in the subsequent auction.

In some implementations, during the auction, a promotion score is determined for each social media item in the set of candidate search results. In some examples, the promotion score is determined based on the relevance score of the respective item and the maximum bid amount of the respective promoter. For example, the promotion score for a particular social media item and a particular promoter can be determined as a product of the relevance score of the social media item, and the maximum bid amount of the promoter. In some examples, candidate social media items are included in the sub-set of social search results based on respective promotion scores. In some examples, a threshold score is provided to determine candidate social media items that are included in the sub-set of social search results. For example, only candidate social media items having promotion scores that are greater than or equal to the threshold score are included in the sub-set of social search results. In some examples, a fixed number of candidate social media items are included in the set of social search results based on the promotion scores. For example, the candidate social media items having the top Q, e.g., three, promotion scores are included in the sub-set of social search results.

In some implementations, a rank order is determined based on respective promotion scores. In some examples, social media items included in the sub-set of search results are displayed based on the rank order.

In some implementations, in response to a social media item being promoted, payment can be received from a respective promoter. For example, a promoter can be charged the maximum bid amount that resulted in a respective social media item being provided as a promoted post in search results.

In some implementations, social search results can be displayed with search results without promoting the social search results. For example, it can be determined that a social search result is responsive to a received query, and that the social search result is not available for promotion, e.g., the author has indicated that the underlying social media item is not available for promotion, there are no promoters for the underlying social media item. In some examples, the social search result can be anyway included with search results displayed to the user. For example, the social search result can be included in the search results 112 provided in the search result display 111.

Implementations of the present disclosure will be discussed in view of an example context. The example context includes Famous Singer, a fictional singer, Awesome Venue, a fictional venue, Label, a fictional music label that Famous Singer is signed to, Music Blogger, a well-known, fictional music blogger, and Corporate Sponsor, a fictional corporation that is sponsoring Famous Singer's tour. In the example context, Famous Singer posts the following example post to one or more social networking services: "Looking forward to playing at Awesome Venue this week!" In the example context, Music Blogger posts the following example post to one or more social networking services: "Famous Singer is tearing it up un tour." In the example context, Awesome Venue posts the following example post to one or more social networking services: "Come see Famous Singer this weekend. Tickets are still available at www.awesomevenue.com."

Continuing with the example context, Label and Corporate Sponsor can be promoters of social media content posted by Famous Singer. For example, each of Label and Corporate Sponsor provides a respective maximum bid amount for social media posts that Famous Singers posts. In this example, Label provides a maximum bid amount for any post authored by Famous Singer, as opposed to providing maximum bid amounts for respective topics. In this example, the maximum bid amount provided by Corporate Sponsor is associated with the topic "Spring Tour," which tour is sponsored by Corporate Sponsor. Consequently, Corporate Sponsor will not be included in an auction, unless the post that is the subject of the auction is authored by Famous Singer, and is determined to be associated with the topic "Spring Tour." Awesome Venue can be a promoter of social media content posted by Awesome Venue. For example, Awesome Venue provides a respective maximum bid amount for social media posts that Awesome Venue posts. Label can be a promoter of social media content posted by B logger. For example, Label provides a respective maximum bid amount for social media posts that B logger posts, and that are about artists that are signed to Label. For example, Label provides a first maximum bid amount for Blogger posts that are determined to be about Famous Singer, and provides a second maximum bid amount for Blogger posts determined to be about Not-so-Famous Singer, another artist that is signed to Label.

Figure 2:
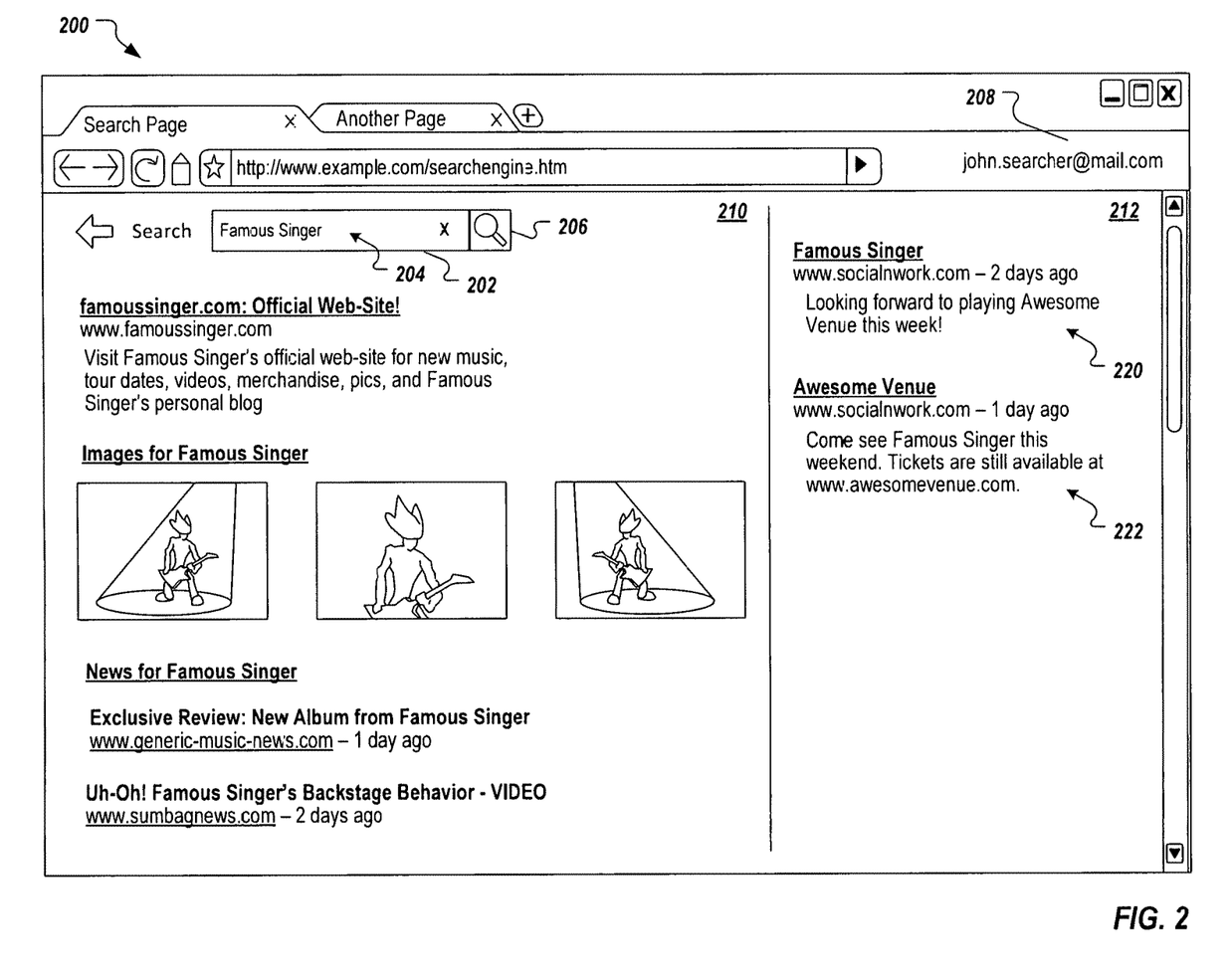
FIG. 2 depicts an example screenshot including promoted social media items in search.

FIG. 2 depicts an example screenshot 200 including promoted social media items in search. The example of FIG. 2 is based on the example context described above. Although the example search results page 200 is depicted inside a web browser, this is for context only and is not intended to limit the scope of the present disclosure to any one web browser or even to implementations involving serving a web page. The example search results page 200 includes a search box 202. In some implementations, the search box 202 may be a text box specified using hypertext markup language (HTML). In implementations, the search box 202 may be a custom component specified by another suitable web development language such as Javascript. The illustrated search box 202 includes a search query 204. In the depicted example, the search query includes "Famous Singer." In some examples, the search query 204 may be entered by a user. In some examples, the search query 204 may be programmatically received through an application programmer interface (API) or other suitable means. The illustrated search box 202 is also associated with a search button 206. In some examples, a user may perform a search on the search query 204 by activating, e.g., clicking on, the search button 206. This activation may be performed by any appropriate mechanism such as clicking the search button 206 with a pointing device, e.g., a mouse, or pressing a key or combination of keys on a keyboard. In some examples, the search query 204 can be automatically submitted as it is being entered. The illustrated search results page 200 also includes user information 208. In the illustrated example, the user information 208 indicates that the user "john.searcher@mail.com" is currently logged in.

The illustrated search results page 200 also includes a search results pane 210 including one or more search results. In some implementations, the search results pane 210 is an HTML frame segregating the search results from other panes of the search results page 200. In some implementations, the search results pane 210 is provided as a consecutive list of search results. The illustrated search results pane 210 includes search results representative of web-sites, images and news articles.

The illustrated search results page 200 also includes promoted social content pane 212, which includes promoted social media content. In the depicted example, promoted social media content includes a promoted post 220 and a promoted post 222. The promoted post 220 corresponds to the above-described example post authored by Famous Singer, and the promoted post 222 corresponds to the above-described example post authored by Awesome Venue.

In the example of FIG. 2, it can be determined that the post "Looking forward to playing at Awesome Venue this week!," posted by Famous Singer, the post "Famous Singer is tearing it up on tour," posted by Blogger, and the post "Come see Famous Singer this weekend. Tickets are still available at www.awesomevenue.com.," posted by Awesome Venue are included in a set of candidate social search results. For example, it is determined that each of the example posts is available for promotion, and bid attributes are provided for each. In some examples, and as described above, a relevance score is provided for each of the posts. For example, respective relevance scores $R_1$, $R_2$ and $R_3$ can be provided. In some examples, and as described above, a bid attribute, e.g., maximum bid amount can be provided for each promoter for a respective post. For example, respective bid amounts $B_1$, $B_2$ and $B_3$ can be provided. In some examples, and as described above, respective promotion scores, e.g., $P_1$, $P_2$, $P_3$, can be provided based on the relevance scores and the bid amounts. For example, each promotion score can be provided as the product of the respective relevance score and bid amount.

In the example context, it can be provided that the social media items having the top two promotion scores are to be included in the sub-set of social search results, and provided for display in response to the query, e.g., in the promoted social content pane 212. In the depicted example, it can be determined that the promotion scores $P_1$ and $P_3$ are greater than the promotion score $P_2$. Consequently, the promoted posts 220, 222 are displayed. In some examples, it can be determined that the promotion score $P_1$ is greater than the promotion score $P_3$. Consequently, the promoted post 220 is displayed higher in the promoted posts pane 212 than the promoted post 222.

Figure 3:
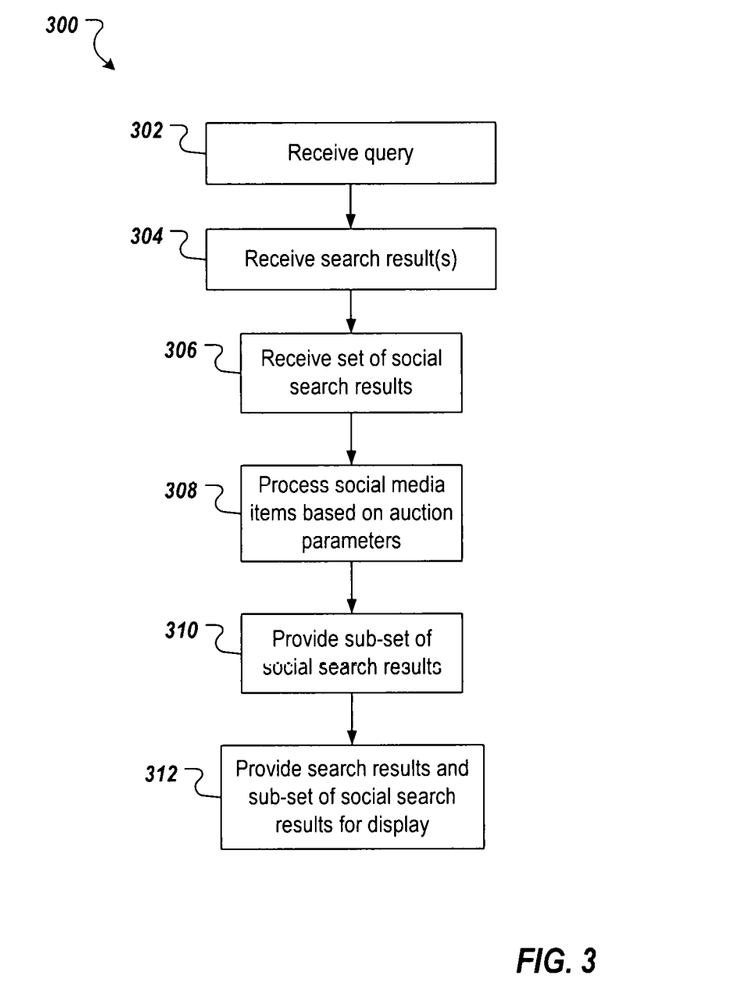
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the search system 120 and/or the promotion system 130 of FIG. 1. In some examples, the example process 300 can be provided by one or more computer-executable programs executed using one or more computing devices. In some implementations, the example process 300 is executed to promote social media content in search.

A query is received (302). For example, a search query is received by the search system 120 of FIG. 1. Search results are received (304). For example, the search system 120 cross-references one or more search indices with the query to receive search results that are responsive to the query. A set of social search results is received (306). For example, the search system 120 and/or the promotion system 130 cross-references one or more social search indices with the query to provide a set of social search results that are responsive to the query. In some examples, the set of social search results includes social media items that are available to be promoted in search results. In some examples, each social search result in the set of social search results includes a respective relevance score, e.g., determined based on the query, and one or more respective bid attributes, e.g., a maximum bid amount a promoter will pay to promote the social media item.

Social media items are processed based on auction parameters (308). For example, the search system 120 and/or the promotion system 130 can process auction parameters, e.g., relevance scores, bid attributes, to provide respective promotion scores for social media items in the set of social search results. A sub-set of social search results is provided (310). For example, the search system 120 and/or the promotion system 130 can include social media items in the sub-set of social search results based on the promotion scores, as described herein. The search results and the sub-set of social search results are provided for display (312). For example, the search system 120 can provide the search results display 111 including the search results 112 and the promoted social search results 113, as described herein.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, from a user device and by search system that includes (i) a search engine, and (ii) a social media content promotion engine, a search query;
obtaining, by the search engine, one or more search results that correspond to resources that are responsive to the search query;
obtaining, by the social media content promotion engine, one or more items of sponsored, social media content that correspond to social media posts that are responsive to the search query;
determining, for each of the social media posts that are responsive to the search query, (i) a sponsor for the social media post, and (ii) a maximum bid amount that the sponsor has provided for the social media post, wherein a particular sponsor for a particular one of the social media posts is different than an entity that originally posted the particular social media post, and wherein the maximum bid amount that the particular sponsor has provided for the particular social media post applies to all posts posted by the entity that originally posted the particular social media post;
selecting one or more items of sponsored, social media content as a result of an auction process that selects items of sponsored, social media content based on the maximum bid amounts; and
generating, by the search engine, a search results page that includes (i) a search results pane that references one or more of the search results that correspond to resources that are responsive to the search query, and (ii) a sponsored social content pane that references the selected one or more of the items of sponsored, social media content that correspond to social media posts that are responsive to the search query.

2. The method of claim 1, wherein the particular social media post comprises a post that was authored by a person that is (i) associated with the search query, and (ii) different than the particular sponsor.

3. The method of claim 1, wherein the entity is associated with the search query.

4. The method of claim 1, wherein the particular social media post is about a location that is associated with the search query, and that is sponsored by a third party.

5. The method of claim 1, wherein the sponsored social content pane comprises a separate region of the search results page than the search results pane.

6. The method of claim 1, comprising ranking the search results, and ranking the items of sponsored, social media content, alter receiving the search query and before generating the search results page.

7. The method of claim 1, wherein the particular sponsor provides the maximum bid for the particular social media post before the entity that is different than the particular sponsor originally posts the particular social media post.

8. A non-transitory computer-readable storage device storing instructions, that when executed by one or more processors, cause performance of operations comprising:
receiving, from a user device and by search system that includes (i) a search engine, and (ii) a social media content promotion engine, a search query;
obtaining, by the search engine, one or more search results that correspond to resources that are responsive to the search query;
obtaining, by the social media content promotion engine, one or more items of sponsored, social media content that correspond to social media posts that are responsive to the search query;
determining, for each of the social media posts that are responsive to the search query, (i) a sponsor for the social media post, and (ii) a maximum bid amount that the sponsor has provided for the social media post, wherein a particular sponsor for a particular one of the social media posts is different than an entity that originally posted the particular social media post, and wherein the maximum bid amount that the particular sponsor has provided for the particular social media post applies to all posts posted by the entity that originally posted the particular social media post;
selecting one or more items of sponsored, social media content as a result of an auction process that selects items of sponsored, social media content based on the maximum bid amounts; and
generating, by the search engine, a search results page that includes (i) a search results pane that references one or more of the search results that correspond to resources that are responsive to the search query, and (ii) a sponsored social content pane that references the selected one or more of the items of sponsored, social media content that correspond to social media posts that are responsive to the search query.

9. The method of claim 8, wherein the particular social media post comprises a post that was authored by a person that is (i) associated with the search query, and (ii) different than the particular sponsor.

10. The method of claim 8, wherein the entity is associated with the search query.

11. The method of claim 8, wherein the particular social media post is about a location that is associated with the search query, and that is sponsored by a third party.

12. The method of claim 8, wherein the sponsored social content pane comprises a separate region of the search results page than the search results pane.

13. The method of claim 8, comprising ranking the search results, and ranking the items of sponsored, social media content, after receiving the search query and before generating the search results page.

14. The method of claim 8, wherein the particular sponsor provides the maximum bid for the particular social media post before the entity that is different than the particular sponsor originally posts the particular social media post.

15. A system comprising: one or more processing devices; and one or more storage devices storing instructions that are executable by the one or more processing devices to perform operations comprising:

receiving, from a user device and by search system that includes (i) a search engine, and (ii) a social media content promotion engine, a search query;

obtaining, by the search engine, one or more search results that correspond to resources that are responsive to the search query;

obtaining, by the social media content promotion engine, one or more items of sponsored, social media content that correspond to social media posts that are responsive to the search query;

determining, for each of the social media posts that are responsive to the search query, (i) a sponsor for the social media post, and (ii) a maximum bid amount that the sponsor has provided for the social media post, wherein a particular sponsor for a particular one of the social media posts is different than an entity that originally posted the particular social media post, and wherein the maximum bid amount that the particular sponsor has provided for the particular social media post applies to all posts posted by the entity that originally posted the particular social media post;

selecting one or more items of sponsored, social media content as a result of an auction process that selects items of sponsored, social media content based on the maximum bid amounts; and generating, by the search engine, a search results page that includes (i) a search results pane that references one or more of the search results that correspond to resources that are responsive to the search query, and (ii) a sponsored social content pane that references the selected one or more of the items of sponsored, social media content that correspond to social media posts that are responsive to the search query.

16. The system of claim 15, wherein the particular social media post comprises a post that was authored by a person that is (i) associated with the search query, and (ii) different than the particular sponsor.

17. The system of claim 15, wherein the entity is associated with the search query.

18. The system of claim 15, wherein the particular social media post is about a location that is associated with the search query, and that is sponsored by a third party.

19. The system of claim 15, wherein the sponsored social content pane comprises a separate region of the search results page than the search results pane.

20. The system of claim 15, wherein the operations comprise ranking the search results, and ranking the items of sponsored, social media content, after receiving the search query and before generating the search results page.

* * * * *